United States Patent [19]
Meyer et al.

[11] Patent Number: 6,158,485
[45] Date of Patent: Dec. 12, 2000

[54] FILLING DEVICE

[75] Inventors: Knut Meyer, Essen; Peter Andreas Löw, Erbach; Thomas Zapp, Eschborn; Christian Kochsmeier, Dortmund, all of Germany

[73] Assignee: Mannesmann VDO AG, Germany

[21] Appl. No.: 09/370,768

[22] Filed: Aug. 9, 1999

[30]   Foreign Application Priority Data

Oct. 8, 1998 [DE] Germany .................. 198 36 057

[51] Int. Cl.$^7$ .................. B65B 1/04; B65B 3/04; B67C 3/00
[52] U.S. Cl. .................. 141/286; 141/234; 141/236; 141/237; 141/285; 141/301; 220/86.2; 220/86.3; 137/256; 137/262
[58] Field of Search .................. 141/18, 100–104, 141/99, 234–237, 285, 286, 301, 302, 387, 391; 220/4.14, 86.1, 86.2, 86.3, 562–564, 905; 137/256, 262, 263, 264

[56]   References Cited

U.S. PATENT DOCUMENTS

| 2,302,097 | 11/1942 | Beckman . | |
|---|---|---|---|
| 2,719,583 | 10/1955 | Malick . | |
| 4,765,359 | 8/1988 | Burnett | 137/255 |
| 4,852,892 | 8/1989 | Reid . | |
| 5,462,100 | 10/1995 | Covert et al. | 141/59 |

*Primary Examiner*—Henry J. Recla
*Assistant Examiner*—Timothy L. Maust
*Attorney, Agent, or Firm*—Mayer, Brown & Platt

[57]   ABSTRACT

In the case of a filling device for a motor vehicle fuel tank, a distributing element extends from a filling nozzle to an anti-surge tower of the motor vehicle. When there is a low volume flow of fuel in the filling nozzle, the distributing element supplies all of the fuel to the anti-surge tower. When there is a large volume flow, the greater part of the fuel passes directly into the fuel tank. It is thereby ensured that during an initial filling or emergency filling with a jerrycan, virtually all of the fuel passes into the anti-surge tower.

20 Claims, 2 Drawing Sheets

FILLING DEVICE

BACKGROUND OF THE INVENTION

The invention relates to a filling device for a motor vehicle fuel tank having at least one anti-surge tower with a delivery unit.

Fuel tanks are filled with fuel via filling nozzles. While this happens, if there is a sufficiently large amount of fuel, part of the fuel passes into the anti-surge tower. In order to ensure continuos filling of the anti-surge tower, a valve is frequently also arranged in the bottom region of the anti-surge tower. This valve ensures that the filling level of the fuel in the anti-surge tower corresponds at least to the height of that region of the fuel tank which surrounds the anti-surge tower. The delivery unit delivers fuel from the anti-surge tower to an internal combustion engine of the motor vehicle. When the level in the fuel tank is sufficiently high, during operation of the internal combustion engine fuel passes into the anti-surge tower via a sucking jet pump driven by the delivery unit. By this means, as fuel consumption progresses, the fuel tank which surrounds the anti-surge tower is emptied first of all, and finally the anti-surge tower itself is emptied.

A disadvantage of the known filling device is that after the fuel tank is completely emptied or when it is initially filled, a very large amount of fuel has to be poured into the fuel tank so that an amount of fuel which is sufficient for operating the delivery unit flows into the anti-surge tower. In the case of an emergency filling using a jerrycan which only holds a few liters, there is also the problem, when the motor vehicle is on a slope, of all of the fuel flowing into a side region of the fuel tank and therefore of no fuel at all passing into the anti-surge tower. The motor vehicle is then unable to be started.

It could be conceivable to conduct fuel which flows into the fuel tank through the filling nozzle directly into the anti-surge tower, so that the latter is filled first of all and then the overflowing fuel is distributed in the fuel tank. However, during normal filling using a fuel-pump nozzle, up to 60 liters of fuel per minute are supplied to the fuel tank, with the result that this design leads to the fuel foaming up. It has furthermore turned out that particularly at large volume flows, the greater part of the fuel sprays out of the anti-surge tower again.

SUMMARY OF THE INVENTION

The invention is based on the problem of designing a filling device of the type mentioned at the beginning in such a manner that the filling of the anti-surge tower as a function of the volume flow and the amount of fuel and also of the geometrical design of the fuel tank can come about in as simple a manner as possible.

According to the invention, this problem is solved by a distributing element which is to be joined to a filling nozzle in the fuel tank and in each case has a branch for the fuel tank and the anti-surge tower.

By this means, the distributing element can be designed in accordance with the volume flow of fuel entering through the filling nozzle. From a high volume flow, which, for example, experiences a forseeable swirl in the filling nozzle, a relatively small subflow can be branched off in a simple manner and supplied to the anti-surge tower. Furthermore, a small amount of fuel supplied at a high volume flow can be banked up in the distributing element and supplied primarily to the anti-surge tower. Since the distributing element can be joined to the filling nozzle, no changes are required for retrofitting existing fuel tanks having filling nozzles. Because of the reliable subflow division according to the invention, a valve arranged in the bottom region of the anti-surge tower can be omitted, since the anti-surge tower is preferably filled during the initial filling and during operation can be filled by a sucking jet pump. The omission of the valve constitutes a significant advantage since it enables the anti-surge tower to be of completely closed design, apart from an overflow opening on the upper side. The motor vehicle can therefore be parked for a prolonged period in a sloping position with the fuel tank virtually empty without the anti-surge tower being able to drain off because of leakage in the valve.

The distributing element could be designed, for example, as a bundle of a plurality of pipes. However, according to an advantageous development of the invention, the distributing element can be manufactured in a particularly cost-efficient manner and fitted in the fuel tank at its end which faces the filling nozzle, it has a common section for a plurality of branches. The filling device according to the invention is thereby also structurally of particularly simple design.

According to another advantageous development of the invention, the distributing element turns out to be structurally particularly simple if a partition for guiding the fuel to the branches is arranged in the common section.

When a filling nozzle opens straight into the fuel tank and when there is a low volume flow of fuel, according to another advantageous development of the invention, all of the fuel passes to a provided branch if the partition divides the common section into channels lying one above another. A subflow is only deflected into the upper channel when there is a large volume flow of fuel.

Gaseous fuel and air can be conducted away from the distributing element in a very simple manner with particularly little constructional outlay if the partition is curved transversely to its longest extent. The curvature causes the production of narrow regions, in which the gases collect, at the side or in the center of the channels. The gases can subsequently be conducted away toward the highest point of the distributing element.

According to another advantageous development of the invention, the distributing element can be manufactured in a particularly cost-efficient manner if the partition is designed as an insert for the common section.

According to another advantageous development of the invention, a plurality of anti-surge towers arranged in the fuel tank can be supplied with fuel, with particularly little constructional outlay, if the distributing element has a plurality of partitions which are connected to one another.

According to another advantageous development of the invention, foaming up of the fuel in the anti-surge tower can be avoided in a simple manner if the branch for the anti-surge tower has a downwardly protruding anti-surge baffle.

According to another advantageous development of the invention, the further reduction in the foaming up of the fuel is assisted if one of the branches is designed for guiding into the bottom region of the anti-surge tower.

According to another advantageous development of the invention, the distributing element can be fitted in a simple manner if the distributing element is provided for arranging on an upper shell part of the fuel tank. By this means, the distributing element can be fastened on the upper half-shell before the shell parts of the fuel tank are joined together. However, it is also possible to fit the distributing element in a fuel tank, produced by blow molding, by the distributing element being placed through an opening into the fuel tank and being fastened there.

According to another advantageous development of the invention, the section can be manufactured cost-efficiently in an injection mold, from which the product can be removed axially, if the common section is divided along its longest extent.

According to another advantageous development of the invention, the distributing element can be fitted in a particularly simple manner if the parts of the distributing element are clipped to one another. Since the distributing element is arranged completely within the fuel tank, no particular tightness requirements as regards the partition are necessary.

In general, the filling devices have a non-return valve for preventing the fuel from splashing out of the filling pipe. A respective non-return valve could be arranged in each of the branches. However, according to another advantageous development of the invention, the filling device according to the invention turns out to be particularly cost-efficient if a non-return valve is arranged between the distributing element and the filling nozzle. The non-return valve may, for example, have a ball pretensioned by a spring, or a flap.

The further reduction in the manufacturing costs of the filling device according to the invention is assisted if the non-return valve together with the distributing element is designed as a constructional unit which can be preassembled.

BRIEF DESCRIPTION OF THE DRAWINGS

The invention permits numerous embodiments. To further clarify its basic principle three of these are represented in the drawing and are described in the following. In the drawing.

DETAILED DESCRIPTION OF THE PREFERRED EMBODIMENTS

Figure 1:
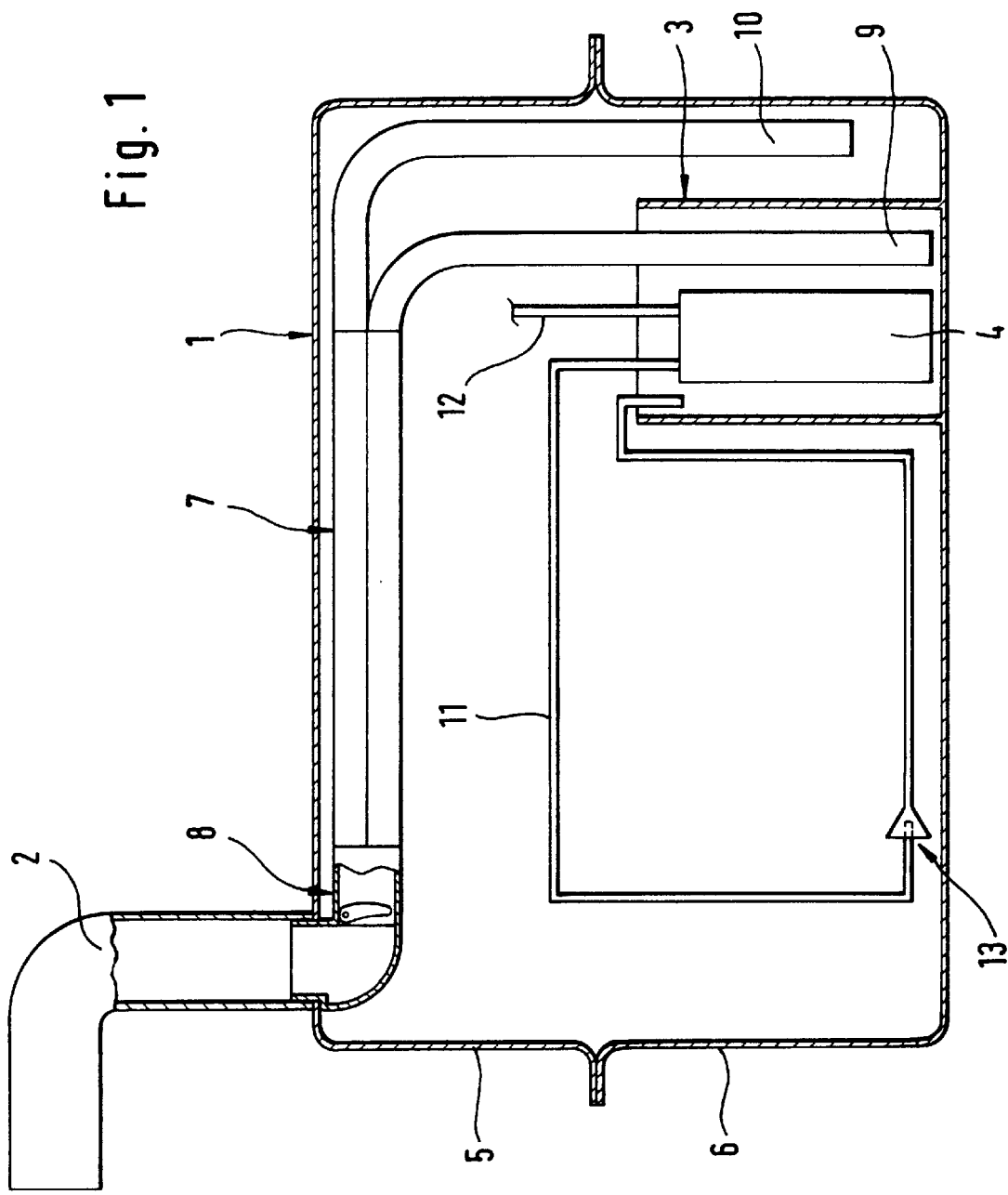
FIG. 1 shows a schematic representation of a fuel tank having a filling device according to the invention.

FIG. 1 shows a fuel tank 1 of a motor vehicle having a filling nozzle 2 and an anti-surge tower 3. A delivery unit 4 is arranged in the anti-surge tower 3. The fuel tank 1 is composed of two shell parts 5, 6. A distributing element 7 is fastened to the inside of the upper shell part 5. The distributing element 7 is connected to the filling nozzle 2 via a non-return valve 8 and has a branch 9, which leads to the anti-surge tower 3, and a branch 10, which is guided into the bottom region of the tank next to the anti-surge tower 3. The arrangement of the branches 9, 10 and their approximately identical length ensure that when the motor vehicle is in a sloping position, preferential flow through one of the branches 9, 10 is largely avoided. The delivery unit 4 delivers fuel from the bottom region of the anti-surge tower 3 to two outlets 11, 12. One of the outlets 11 is connected to a sucking jet pump 13, which is arranged in the bottom region of the fuel tank 1, while the second outlet 12 leads to an internal combustion engine (not shown) of the motor vehicle.

Fuel which is poured into the fuel tank 1 is divided up into the branches 9, 10 right at the beginning of the distributing element 7. The branch 9, which opens into the anti-surge tower 3, is situated below that branch 10 which is guided to the bottom region of the fuel tank 1. As a result, when there is a low volume flow of fuel flowing through the filling nozzle 2, all of the fuel is supplied to the anti-surge tower 3. A large volume flow passes into both branches 9, 10, so that a vigorous formation of foam in the anti-surge tower 3 is avoided. The division of the volume flow can be brought about in a simple manner by the ratio of the cross sections of the branches 9, 10.

Figure 2:
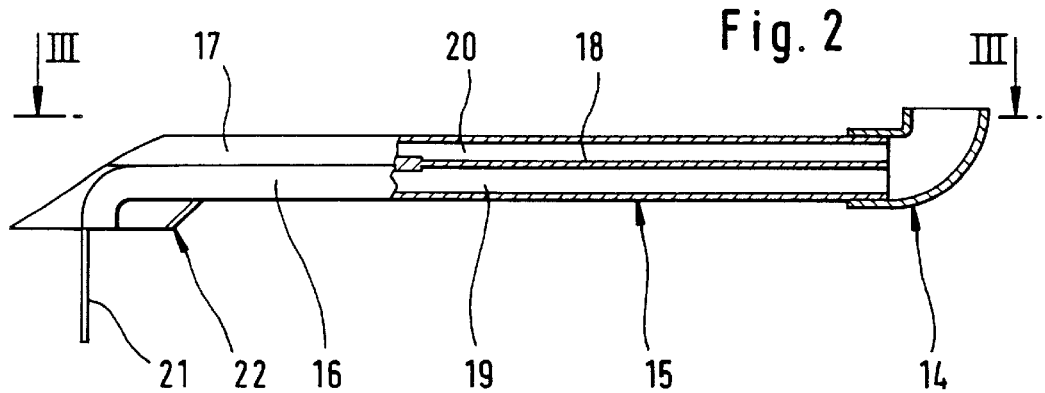
FIG. 2 shows a distributing element of a second embodiment of the filling device, in a view from above.

FIG. 2 shows a distributing element 14 having a common section 15 for two branches 16, 17. For clarification purposes, the section 15 is shown cut away. A horizontal partition 18 is arranged in the section 15 to divide it into two channels 19, 20 lying one above the other. One of the branches 16 has a downwardly protruding anti-surge baffle 21. In the case of the arrangement of the distributing element 14 in the fuel tank 1 shown in FIG. 1, the anti-surge baffle 21 is to be introduced from above into the anti-surge tower 3. The other branch 17 has a duct 22 for guiding the fuel into the fuel tank 1 shown in FIG. 1.

Figure 3:
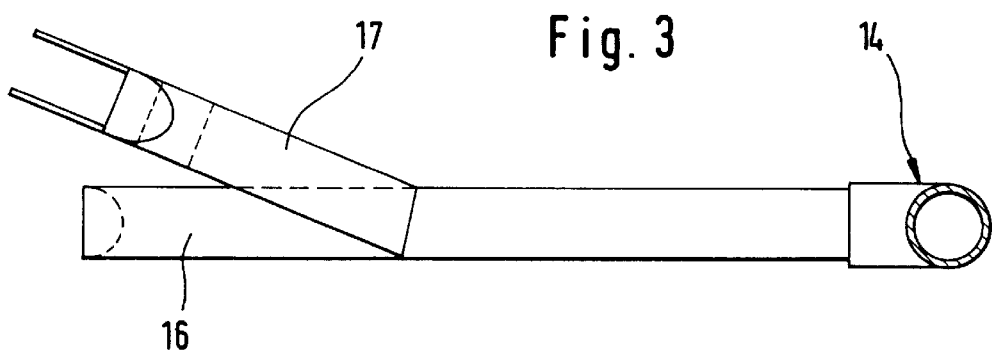
FIG. 3 shows a longitudinal section through the distributing element from FIG. 2 along the line III—III.

FIG. 3 shows, in a view from above, that the branches 16, 17 are only separated from each other shortly before the end of the distributing element 14. As a result, the branches 16, 17 are of approximately the same length.

Figure 4:
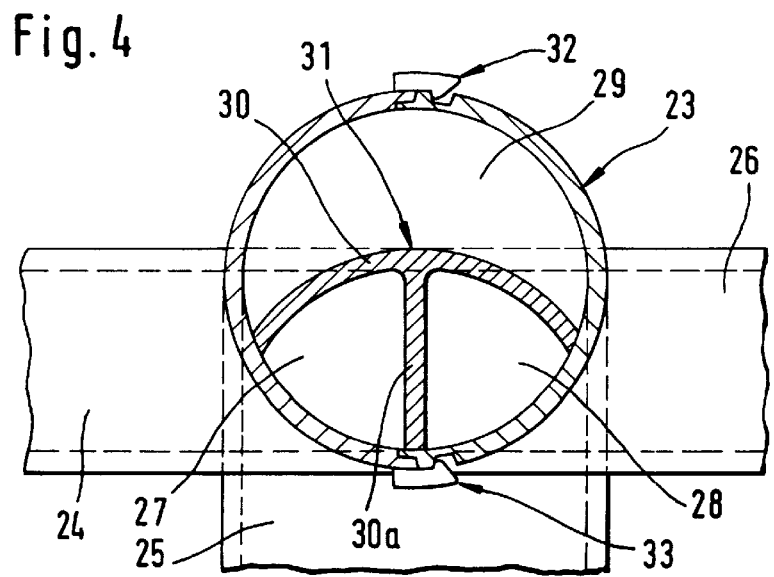
FIG. 4 shows a cross section through a distributing element of a further embodiment of the filling device.

FIG. 4 shows a cross section of a distributing element 23 having three channels 27–29 leading to a respective branch 24–26. The channels 27–29 are separated from one another by partitions 30, 30a which are designed as an insert for the distributing element 23. In this region, the distributing element 23 has a common section 31 for the channels 27–29. The horizontal partition 30 is curved longitudinally with respect to its longest extent. FIG. 4 furthermore shows that the distributing element 23 is divided along its longest extent and is held together at its point of separation by clip connections 32, 33.

What is claimed is:

1. A filling device for a motor vehicle fuel tank which has at least one anti-surge tower for a delivery unit, wherein the anti-surge tower is adapted to receive fuel, the filling device comprising a distributing element which is joined to a filling nozzle in the fuel tank and has at least one branch for filling the fuel tank and at least one branch for filling the anti-surge tower.

2. The filling device as claimed in claim 1, wherein the distributing element has an end which faces the filling nozzle, and the distributing element has a common section at said end for a plurality of branches.

3. The filling device as claimed in claim 2, wherein a partition for guiding the fuel to the branches is arranged in the common section.

4. The filling device as claimed in claim 3, wherein the partition divides the common section into channels lying one above another.

5. The filling device as claimed in claim 3, wherein the partition is curved transversely to its longest extent.

6. The filling device as claimed in claim 4, wherein the partition is curved transversely to its longest extent.

7. The filling device as claimed in claim 3, wherein the partition is designed as an insert for the common section.

8. The filling device as claimed in claim 4, wherein the partition is designed as an insert for the common section.

9. The filling device as claimed in claim 1, wherein the distributing element has a plurality of partitions which are connected to one another.

10. The filling device as claimed in claim 2, wherein the distributing element has a plurality of partitions which are connected to one another.

11. The filling device as claimed in claim 1, wherein the branch for the anti-surge tower has a downwardly protruding anti-surge baffle.

12. The filling device as claimed in claim 1, wherein one of the branches is designed for guiding into the bottom region of the anti-surge tower.

13. The filling device as claimed in claim 2, wherein one of the branches is designed for guiding into the bottom region of the anti-surge tower.

14. The filling device as claimed in claim 1, wherein the distributing element is provided for arranging on an upper shell part of the fuel tank.

15. The filling device as claimed in claim 2, wherein the common section is divided along its longest extent.

16. The filling device as claimed in claim 9 wherein the distributing element is made of at least two parts and wherein the parts of the distributing element are clipped to one another.

17. The filling device as claimed in claim 1, further comprising a non-return valve between the distributing element and the filling nozzle.

18. The filling device as claimed in claim 2, further comprising a non-return valve between the distributing element and the filling nozzle.

19. The filling device as claimed in claim 17, wherein the non-return valve together with the distributing element is designed as a constructional unit which can be preassembled.

20. The filling device as claimed in claim 18, wherein the non-return valve together with the distributing element is designed as a constructional unit which can be preassembled.

* * * * *